(12) United States Patent
Ruess et al.

(10) Patent No.: US 9,686,132 B2
(45) Date of Patent: Jun. 20, 2017

(54) TERMINAL, MONITORING SYSTEM HAVING SAID TERMINAL AND METHOD FOR INITIALIZING THE TERMINAL

(71) Applicant: Robert Bosch GmbH, Stuttgart (DE)

(72) Inventors: Kilian Ruess, Riemerling (DE); Andreas Baumann, Munich (DE); Rainer Bauereiss, Baiersdorf (DE)

(73) Assignee: ROBERT BOSCH GMBH, Stuttgart (DE)

( * ) Notice: Subject to any disclaimer, the term of this patent is extended or adjusted under 35 U.S.C. 154(b) by 154 days.

(21) Appl. No.: 14/429,393

(22) PCT Filed: Sep. 20, 2013

(86) PCT No.: PCT/EP2013/069627
§ 371 (c)(1),
(2) Date: Mar. 19, 2015

(87) PCT Pub. No.: WO2014/044824
PCT Pub. Date: Mar. 27, 2014

(65) Prior Publication Data
US 2015/0256389 A1    Sep. 10, 2015

(30) Foreign Application Priority Data
Sep. 24, 2012 (DE) .......... 10 2012 217 144

(51) Int. Cl.
*H04L 12/24* (2006.01)
*H04L 29/06* (2006.01)
(Continued)

(52) U.S. Cl.
CPC ........ *H04L 41/0806* (2013.01); *H04L 61/103* (2013.01); *H04L 61/2514* (2013.01);
(Continued)

(58) Field of Classification Search
CPC ............ H04L 63/0823; H04L 41/0806; H04L 61/103; H04L 61/2038; H04L 61/2514; H04L 67/025; H04L 67/32
(Continued)

(56) References Cited

U.S. PATENT DOCUMENTS

| 2006/0173997 A1* | 8/2006 | Tullberg | H04L 29/12509 709/224 |
| 2006/0195568 A1* | 8/2006 | Staurnes | H04L 29/12471 709/224 |

(Continued)

OTHER PUBLICATIONS

International Search Report for Application No. PCT/EP2013/069627 dated Dec. 20, 2013 (English Translation, 2 pages).

*Primary Examiner* — Ruolei Zong
(74) *Attorney, Agent, or Firm* — Michael Best & Friedrich LLP

(57) ABSTRACT

The monitoring of complex or spacious buildings or spaces requires a multiplicity of monitoring devices, for example monitoring cameras, in order to be able to extensively cover such monitoring areas. For this purpose, the invention proposes a terminal 7 having at least one functional device, wherein the functional device is in the form of a sensor and/or actuator device, having a control device 10, wherein the control device 10 is in the form of a digital data processing device, and having at least one network interface 9, wherein the network interface 9 is designed to couple the control device 10 to a network 2, with the result that data can be transmitted from the functional device to the network 2 and/or data can be transmitted from the network 2 to the functional device. The terminal 7 has a client address from a first network 2 as the network, and the terminal 7 has a storage device 11 which stores a server address from a different network 4. The control device 10 is designed to
(Continued)

send a message to the server address via the network interface 9 upon initialization of the terminal 7.

10 Claims, 3 Drawing Sheets

(51) Int. Cl.
*H04L 29/08* (2006.01)
*H04L 29/12* (2006.01)

(52) U.S. Cl.
CPC ........ *H04L 63/0823* (2013.01); *H04L 67/025* (2013.01); *H04L 67/32* (2013.01); *H04L 61/2038* (2013.01)

(58) Field of Classification Search
USPC .......................................... 709/222
See application file for complete search history.

(56) References Cited

U.S. PATENT DOCUMENTS

| | | | |
|---|---|---|---|
| 2008/0045218 A1* | 2/2008 | Okochi | H04B 5/0062 455/436 |
| 2011/0131320 A1* | 6/2011 | Hong | H04W 92/02 709/224 |

\* cited by examiner

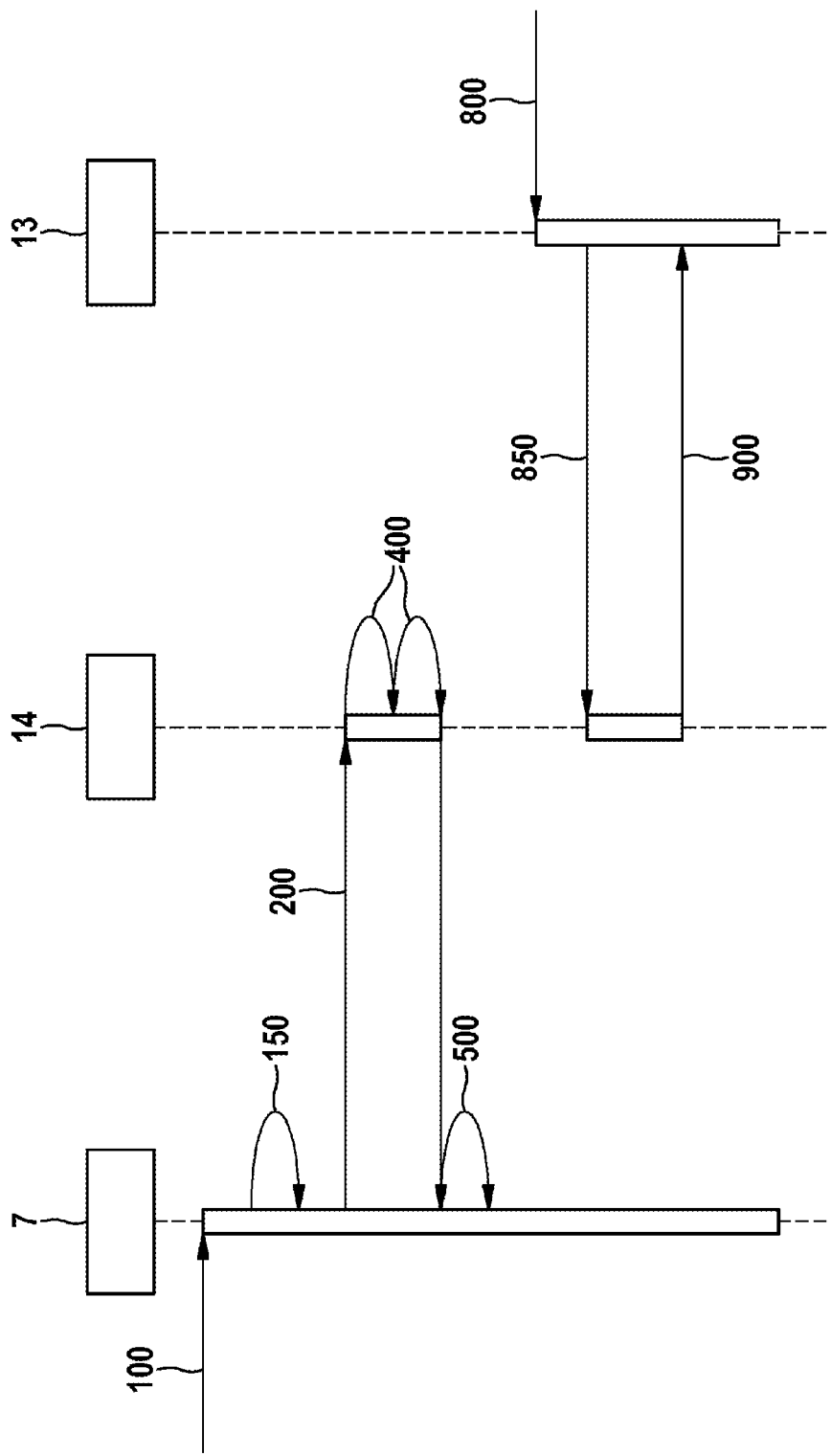

TERMINAL, MONITORING SYSTEM HAVING SAID TERMINAL AND METHOD FOR INITIALIZING THE TERMINAL

BACKGROUND OF THE INVENTION

The monitoring of complex or spacious buildings or spaces requires a multiplicity of monitoring devices, for example monitoring cameras, in order to be able to extensively cover such monitoring areas. Whereas, in earlier monitoring installations, the image data streams were transmitted by the monitoring cameras in analog form to monitoring centers and were evaluated there, it has become known in the meantime to connect monitoring cameras to a data network and to digitally transmit the image data streams. For this purpose, it is necessary to integrate the monitoring cameras in the data network and to allocate a network address (IP address) to them. The monitoring camera must then be "found" by the monitoring center in the data network in order to be able to communicate with it. Consequently, the integration of a monitoring camera in a network usually requires the sophisticated expert knowledge of a system administrator in order to be able to carry out the start-up process without errors.

SUMMARY OF THE INVENTION

The invention relates to a terminal (also called edge device) which is suitable and/or designed for integration in a monitoring system. In particular, the terminal forms an interface between the monitoring system and a monitoring area.

The terminal has at least one functional device, the functional device being in the form of a sensor and/or actuator device. The functional device may be, for example, in the form of an automatic or manual fire detector, a temperature sensor, an object sensor, for example a light barrier, a door opener, a turnstile opener etc.

The terminal comprises a control device, the control device being in the form of a digital data processing device. In particular, the digital data processing device is in the form of a computer having an operating system.

The terminal comprises at least one network interface which allows the control device or the terminal to be coupled to a network. The network is particularly preferably a data network which operates on the basis of the TCP/IP protocol. It is an Ethernet network, in particular. The network interface and/or the control device allow(s) data to be transmitted from the functional device to the network and/or allow(s) data to be transmitted from the network to the functional device. It is therefore possible, for example, to transmit sensor data from the sensor device to the network or to transmit command data from the network to the actuator device. It is also possible, for example, for bidirectional communication to take place via the network interface for the purpose of configuring the functional device.

The terminal has a client address from a first network, the first network preferably being in the form of a LAN (Local Area Network). The first network is in the form of a local subnet, in particular.

The scope of the invention proposes that the terminal has a storage device which stores a server address from another network. The storage device is particularly preferably in the form of a nonvolatile memory. In particular, the storage device is preconfigured, with the result that the server address is stored in the storage device ex works, for example, and is therefore known. The control device is designed, in terms of programming and/or circuitry, to transmit a message to the server address when initializing the terminal via the network interface. The terminal therefore has the functionality whereby the message is preferably transmitted from the terminal into the first network in an automatic or automated manner and is transmitted from there into the other network to the server when initializing the terminal, the server address being preconfigured in the terminal. The terminal is therefore designed, in terms of programming and/or circuitry, to actively set up communication with the server at the preconfigured server address during initialization.

The configuration of the terminal according to the invention makes it possible for the terminal to register with the server automatically, in particular without user interaction. This considerably simplifies the installation of the terminal in the first network. The terminal is therefore a technical solution to the problem which exists in a widely distributed network having at least one local subnet as the first network and a main network as the other network when the local subnet is separated from the main network by a router. As a result of the separation (NAT), network subscribers (clients) in the local subnets are invisible to the applications and devices in the main network as the other network. The router of the local subnet, for example, would conventionally have to be reconfigured in such a manner that individual ports are visible to the clients in the local subnet. However, this method harbors security risks since the enabled port is also visible to other subscribers in the main network.

In contrast, the terminal according to the invention uses the decisive advantage that it already knows the counterpart station, the server as backend, in advance since the server address is stored in a preconfigured manner in the storage device. The operation of setting up a connection from the terminal to the server is therefore communication from the local subnet as the first network to the main network as the other network and not the other way round. Conventional routers or NAT devices allow connections in this direction and need not be reparameterized in a complicated manner. The server as backend can in turn use the connection which has been set up in order to communicate with the terminal and to make further requests. For example, the terminal can be parameterized by the server in this manner and data, for example video screens, can be requested or transmitted.

The terminal therefore has a plurality of advantages: less configuration effort is needed since it is possible to overcome an NAT limit without router configuration. The terminal allows a plug-and-play device since the terminal in the first network must only receive a network address.

In one preferred implementation of the invention, the functional devices and the control device are integrated in a housing. In this form, the terminal is particularly compact and can be easily constructed since only the housing has to be mounted and the network connection established.

The terminal is particularly preferably in the form of an embedded system and/or an intelligent functional component. Linux (Embedded Linux) NetBSD or Windows (CE, XP Embedded, Automotive or Embedded for PoS) is preferably used as the operating system. A wide variety of functions can be implemented with little hardware complexity on account of the design as an embedded system/intelligent functional component.

In one preferred refinement of the invention, the message comprises a unique device ID, thus making it possible for the server to uniquely identify the terminal. The device ID (also simply called ID below) may be in the form of a number sequence and/or numerical sequence, for example.

The server can derive both the type and/or range of functions of the terminal and further information, for example instruction sets and communication details, from the ID.

In one preferred development of the invention, the terminal is designed to establish bidirectional communication with the server with certificate-based authentication. In particular, the terminal is designed to carry out an SSL handshake with the server in order to enable secure communication between the server and the terminal. The storage device of the terminal particularly preferably has an authentication certificate. Instead of SSL communication, it is also possible to use another encryption protocol for secure data transmission, for example TLS (Transport Layer Security). The certificate-based authentication effectively prevents eavesdropping or misuse of the terminal.

In one preferred refinement of the invention, the control device has a connection module which is designed to transmit the message repeatedly in succession. In particular, the message is transmitted until there is a response from the server.

It is particularly preferred for the connection module to be designed in such a manner that the intervals of time between the transmission of the messages are increased on the basis of the time from initialization and/or on the basis of the transmitted messages. This refinement is based on the consideration that errors may definitely occur when setting up a connection, with the result that it is useful to repeatedly transmit the message. However, if it is not possible to establish a connection within a definable period of time, it can be assumed that there are physical network problems and immediate repetition of the message is useless. For example, the message is first of all transmitted in an interval of 10 seconds; if there is no corresponding response from the server within the first hour, the interval is increased to 30 seconds and—if there is no response from the server after a period of seven days, for example—the interval is increased to 300 seconds. This makes it possible, on the one hand, to regularly try and test the connection set-up and, on the other hand, to operate the terminal in an energy-saving manner.

In one particularly simple and therefore preferred refinement of the invention, initialization is started automatically by switching on the terminal, in particular by connecting the terminal to a voltage supply. During start-up, it is therefore sufficient to connect the network interface to the first network and to then switch on the terminal, the subsequent initialization taking place automatically. It is also possible for the voltage to be supplied via the network (POE—Power Over Ethernet), with the result that it is sufficient to connect the terminal to the first network in order to start initialization.

In one preferred development of the invention, the terminal is in the form of a monitoring camera, in particular a digital monitoring camera. In this refinement, it is possible for the monitoring camera to also be in the form of a so-called PTZ (Pan-Tilt-Zoom) camera which can change the viewing direction and the image excerpt in a controlled manner. As explained above, the integration of the monitoring camera functions via the plug-and-play device.

The invention also relates to a monitoring system (can also be called monitoring installation) having at least one terminal as described above or as claimed in one of the preceding claims. The monitoring system also has the server, the terminal having the client address from the first network and the server having the server address from the other network.

The two networks are particularly preferably separated from one another via at least one NAT (Network Address Translation) device, with the result that the message is transmitted from the terminal to the server via the at least one NAT device. Such an NAT device is arranged between two networks using data technology in order to connect different networks to one another. The NAT device is particularly preferably in the form of a router. The NAT device has the function of replacing address information in data packets with other address information in an automated manner. This makes it possible, for example, for the server to address the terminal using an address formed by the IP address and a port of the NAT device but without knowing the actual IP address (client address) in the local network as the first network of the terminal. The NAT device performs the function of translating its own IP address and the specified port into an IP address, that is to say the client address, and a specified port in the first network. The address information is preferably replaced in the opposite direction in the same manner.

One preferred development provides for the first network to have a DHCP (Dynamic Host Configuration Protocol) functionality, which enables the terminal to be automatically incorporated in the first network without manual configuration of the terminal. In particular, the automatic obtaining of the IP address is set on the terminal. This configuration again simplifies the installation of the terminal.

The invention also relates to a method for initializing the terminal as described above in the monitoring system as likewise described above, the terminal transmitting a message to the server address during its initialization. In particular, the method comprises the intended use of the terminal and/or of the monitoring system.

BRIEF DESCRIPTION OF THE DRAWINGS

Further features, advantages and effects of the invention emerge from the following description of a preferred exemplary embodiment of the invention and the accompanying figures, in which:

FIG. 3 shows a schematic diagram for explaining the method in FIG. 2 further.

DETAILED DESCRIPTION

Figure 1:
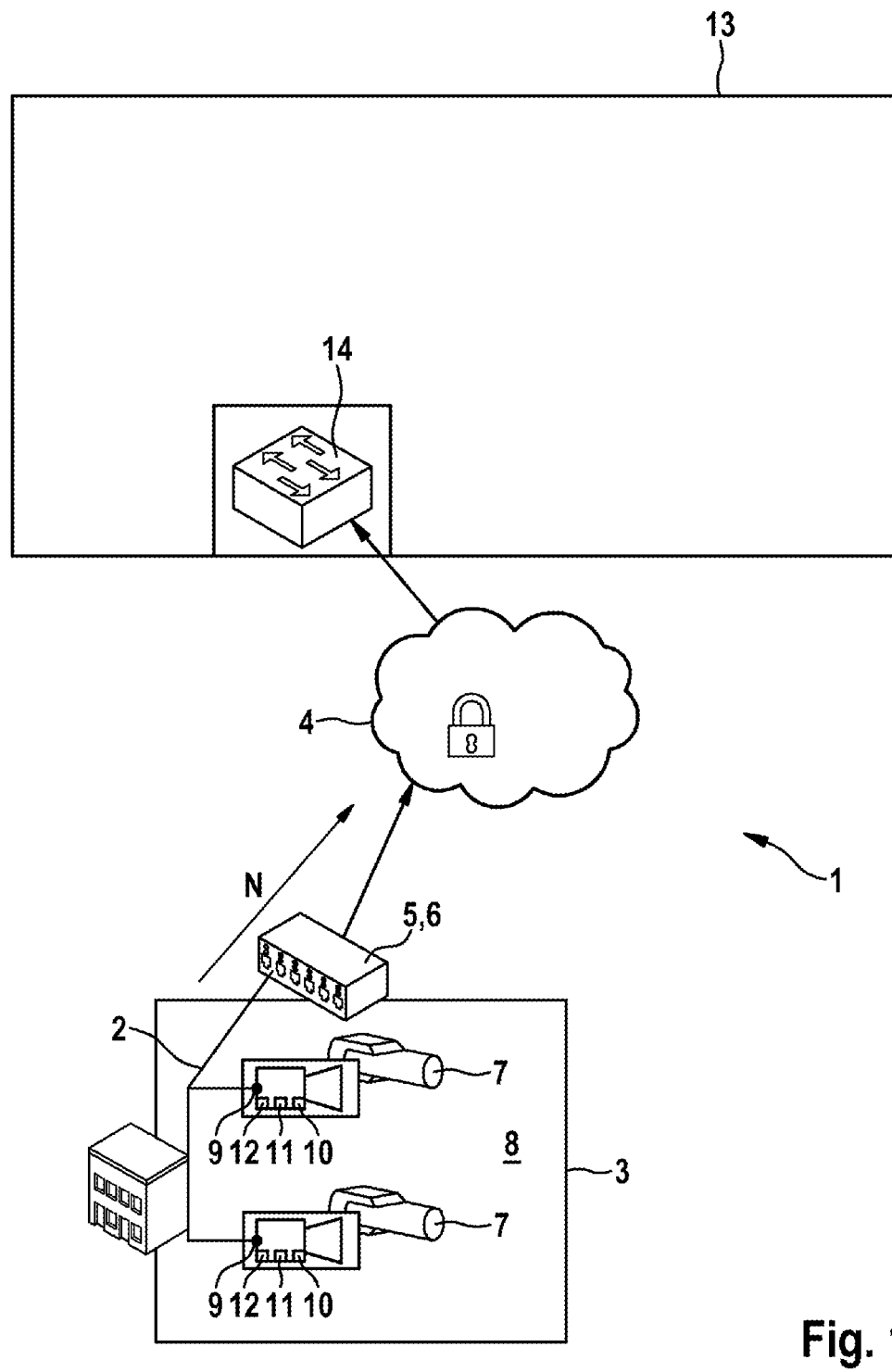
FIG. 1 shows a schematic block diagram of a monitoring system as an exemplary embodiment of the invention.

FIG. 1 shows a schematic block diagram of a monitoring system 1 as an exemplary embodiment of the invention. The monitoring system 1 comprises at least one local monitoring network as a first network 2. The first network 2 is installed in a monitoring object 3, for example in a building or building complex, a train station, an airport etc.

The first network 2 is in the form of a local network and defines one or at least one local domain. The first network 2 is in the form of a LAN, for example. Each of the network subscribers in the first network 2 has a local IP address.

As an interface to another network 4, the first network 2 has a router 5 which comprises an NAT device 6. The NAT device 6 is designed to translate network addresses between the first network 2 and the other network 4. In particular, the first network 2 is an exclusively private network and the other network 4 is the Internet or a tier-3 or tier-2 or tier-1 network.

At least one terminal 7 having a functional device 12 is arranged in the first network 2. In the illustrated design of the terminal 7 as a monitoring camera, this terminal comprises a camera device as the functional device 12 which is designed to monitor a monitoring area 8 in the monitoring object 3. The terminals 7 each have a network interface 9 via which the terminals 7 in the first network 2 can communicate. The terminals 7 are in the form of intelligent terminals 7 each comprising a control device 10 and a local storage device 11.

The other network 4 is based on the Internet protocol and, in a first design alternative, may be in the form of a public Internet. Alternatively, the other network 4 is in the form of a private IP network, in which case all interfaces of the other network 4 are exclusively assigned to the private IP network and the private IP network is separated from the public Internet, in particular, using data technology. Alternatively, the other network 4 may also be in the form of a LAN (Local Area Network) or a WAN (Wide Area Network). In particular, the other network 4 implements a TCP connection.

The monitoring system 1 comprises a security control device, in particular a central or global security control device, which is in the form of a server 13. The server 13 is connected to the other network 4 and therefore indirectly to the first network 2 via an interface using data technology.

During operation of the monitoring system 1, monitoring data from the terminals 7 can be forwarded from the first network 2, via the router 5 or the NAT device 6, to the server 13 in the form of a security control device. Depending on its design, the server 13 can then evaluate the monitoring data and can trigger an alarm in an automated manner or can forward the monitoring data to monitoring personnel. In the opposite direction, the server 13 can transmit configuration data or data queries to the terminals 7 via the other network 4 and the router/NAT device 5/6. If the terminals 7 are in the form of monitoring cameras, images of the monitoring area 8 are transmitted in the direction of the server 13.

When in the form of intelligent monitoring cameras, the terminals 7 can also autonomously evaluate the monitoring data using the control device 10. Other terminals 7, for example door openers, fire detectors etc., can also be integrated in the first network 2 as an alternative or in addition to the monitoring cameras.

Local IP addresses are assigned to each of the terminals 7 as client addresses in the first network 2. An IP address is assigned to the server 13 as a server address in the other network 4. Provision may optionally be made for the server 13 to in turn be arranged in a local network, the server nevertheless being able to be reached via the other network 4 using the server address.

When installing the terminals 7, the problem now arises of the terminals 7 in the first network 2 being "invisible" to the server 13 in terms of data technology since said terminals are arranged downstream of the NAT device 6.

In order to establish communication between the server 13 and the terminals 7 in a user-friendly manner, the terminals 7 each have a socket-knocker transmitter functionality and the server 13 has a socket-knocker receiver functionality. For the purpose of implementation, the storage device 11 of the terminal 7 permanently stores the server address of the server 13. This can be carried out, for example, by pre-configuring the terminals 7. The storage device 11 also stores a unique ID of the terminal 7. A certificate for mutual authentication of the terminal 7 and the server 13 is also optionally stored in the storage device 11. In order to implement the socket-knocker receiver functionality, the server 13 has a device manager 14 which is in the form of a program or a service in the server 13, for example.

Figure 2:
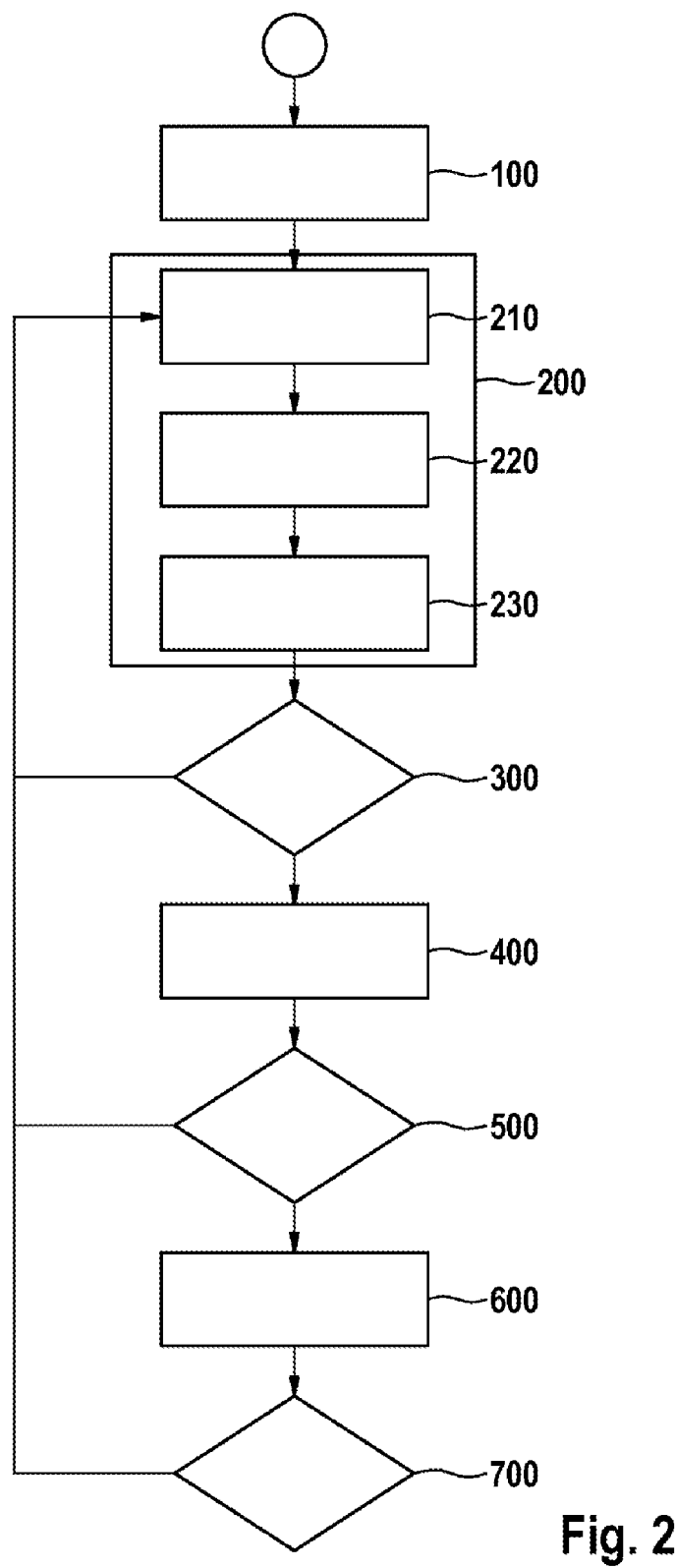
FIG. 2 shows a flowchart for explaining the method for starting up a terminal in the monitoring system from FIG. 1.

In order to explain the process of setting up a connection between the terminal 7 and the device manager 14, reference is made to FIG. 2.

In a step 100, the terminal 7 is switched on, is connected to a voltage supply or is connected to the first network 2, with the result that the terminal 7 is started up.

In a step 200, a message N is transmitted from the terminal 7 to the server 13, in particular to the device manager 14, as a knock. The transmission can be implemented by a connection module (not illustrated) of the control device 10 which is likewise in the form of a program or service. The message N comprises the unique ID of the terminal 7.

The transmission of the message N to the server 13 starts an NAT session in the NAT device 6, in which case the associated connection information, in particular the IP addresses, ports and possibly time-outs, are stored in an NAT table. The NAT device 6 can use the stored information to correctly assign a response data packet from the device manager 14 or the server 13 to the respective terminal 7. A bidirectional connection is therefore initiated by transmitting the message N to the server 13.

If the server 13, in particular the device manager 14, receives the message N, the device manager 14 uses the unique ID to add the terminal 7 to a device list which is made available to the server 13 by the device manager. The device manager 14 also initiates an SSL handshake with the terminal 7.

In a step 300, the terminal 7 waits in order to determine whether it receives a response data packet from the device manager 14. If this is not the case, the transmission of the message N is repeated. If this is the case, the SSL handshake is accepted and a secure connection to the device manager 14 and therefore to the server 13 is established in a step 400.

For the purpose of security, a check is carried out in a step 500 in order to determine whether the certificate of the device manager 14 matches the certificate stored in the storage device 11.

In a step 600, the established connection is kept open in order to be able to receive incoming requests from the device manager 14 or the server 13. If the connection is lost or a time-out takes place in a step 700, the procedure is restarted.

The client address in the first network 2 can be allocated manually, on the one hand, but it is easier for the terminal 7 to receive the client address automatically via a DHCP functionality in a step 150 (FIG. 3). FIG. 3 shows the method again in another illustration:

The terminal 7 is switched on in step 100. The terminal 7 receives the client address via DHCP in step 150. The message N is transmitted to the device manager 14 in step 200. In step 400, the terminal 7 is added to the device list and the SSL handshake is prepared. In step 500, the identity of the device manager 14 is validated by the terminal 7. It is optionally possible for an external query to be made in a step 800 in order to determine whether new terminals 7 are known to the server 13 or the device manager 14. In this case, a request for new devices is directed to the device manager 14 by the server 13 in a step 850 and the device list containing the terminals 7 is transmitted to the server 13 in a step 900.

Provision may optionally be made for the transmission of the message N to be repeated if it has been determined in step 300 that no response has been received from the device manager 14 or the server 13 and the knock was therefore unsuccessful. In this case, the temporal length of a transmission interval is determined in a step 210. For example, the transmission interval is extended if no response has been received after a few attempts. Waiting is carried out for the temporal length of the knock interval in a step 220 and the message N is transmitted again in a step 230.

The invention claimed is:

1. A terminal comprising:
    a sensor, an actuator, or both a sensor and an actuator ("functional device"),
    a digital data processor,
    at least one network interface, the network interface being designed to couple the digital data processor to a first network, with the result that data can be transmitted from the functional device to the network, data can be transmitted from the network to the functional device, or both,
    a client address from the first network,
    a storage device which stores a server address from a second network,
    the digital data processor being designed to transmit a message to the server address when initializing the terminal via the network interface, to actively set up communication with the server at the stored server address from the second network during initialization, and including a connection module, the connection module configured to transmit the message several times in succession and to increase the intervals of time between the transmission of the message on the basis of the time from initialization, on the basis of the number of transmitted messages, or both.

2. The terminal as claimed in claim 1, wherein the functional device and the digital data processor are integrated in a housing.

3. The terminal as claimed in claim 1, wherein the message comprises a device ID of the terminal.

4. The terminal as claimed in claim 1, wherein the terminal is configured to establish bidirectional communication with certificate-based authentication.

5. The terminal as claimed in claim 1, wherein initialization is started automatically by switching on the terminal.

6. The terminal as claimed in claim 1, wherein the terminal comprises a monitoring camera.

7. A monitoring system comprising:
    at least one terminal, the at least one terminal including,
    a sensor, an actuator, or both a sensor and an actuator ("functional device"),
    a digital data processor,
    at least one network interface, the network interface being designed to couple the digital data processor to a first network, with the result that data can be transmitted from the functional device to the network, data can be transmitted from the network to the functional device, or both,
    a client address from the first network,
    a storage device which stores a server address from a second network,
    the digital data processor being designed to transmit a message to the server address when initializing the terminal via the network interface, to actively set up communication with the server at the stored server address from the second network during initialization, and including a connection module, the connection module configured to transmit the message several times in succession and to increase the intervals of time between the transmission of the message on the basis of the time from initialization, on the basis of the number of transmitted messages, or both and
    a server having the server address.

8. The monitoring system as claimed in claim 7, wherein at least one NAT device, the first network and the second network are connected to one another using data technology via the NAT device, and the message being transmitted from the terminal to the server via the at least one NAT device.

9. The monitoring system as claimed in claim 7, wherein the first network has a DHCP functionality.

10. A method for initializing a terminal in a monitoring system, wherein the terminal includes
    a sensor, an actuator, or both a sensor and an actuator ("functional device"),
    a digital data processor,
    at least one network interface, the network interface being designed to couple the digital data processor to a first network, with the result that data can be transmitted from the functional device to the network, data can be transmitted from the network to the functional device, or both,
    a client address from the first network,
    a storage device which stores a server address from a second network, the digital data processor being designed to transmit a message to the server address when initializing the terminal via the network interface, to actively set up communication with the server at the stored server address from the second network during initialization, and including a connection module, the connection module configured to transmit the message several times in succession and to increase the intervals of time between the transmission of the message on the basis of the time from initialization, on the basis of the number of transmitted messages, or both,
    the method comprising the terminal transmitting a message to the server address during its initialization.

* * * * *